Figure 1:
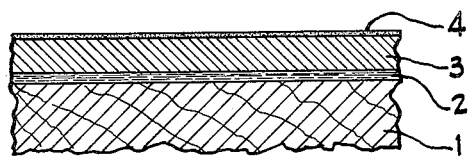

July 25, 1961 A. C. ABBOTT, JR., ET AL 2,993,807
SYSTEM OF SUBSTRATE FINISHING WITH POLYESTER COATINGS
Filed Oct. 17, 1957

INVENTORS
AUSTIN C. ABBOTT, JR.
MARY G. BRODIE
BY
ATTORNEY

United States Patent Office 2,993,807
Patented July 25, 1961

2,993,807
SYSTEM OF SUBSTRATE FINISHING WITH POLYESTER COATINGS
Austin C. Abbott, Jr., Hammond, Ind., and Mary G. Brodie, Chicago, Ill., assignors to The Sherwin-Williams Company, Cleveland, Ohio, a corporation of Ohio
Filed Oct. 17, 1957, Ser. No. 690,633
18 Claims. (Cl. 117—72)

This invention relates to a method of coating substrates with unsaturated polyester resins, heretofore, impractical of accomplishment due to inhibition of surface cure, crawling and catering and poor adhesion of unsaturated polyesters when applied as a surface coating.

Unsaturated polyesters have had little acceptance in the coating art due to the above noted defects which appear to be inherent in this class of polymeric material. However, due to their excellent chemical resistance, film build, general toughness and other good qualities it has long been known to be advantageous to employ, if it were practical to do so, unsaturated polyesters in fine furniture finishing, pre-finished flooring and for other substrate finishes.

The invention in its broadest aspect provides a solution to the problem of obtaining a full cure of the surface of unsaturated polyester resins when applied as coatings over substrates by more or less immediate application to fresh unsaturated polyester film surfaces of a mist coat of a resin selected from the group consisting of reactive polyisocyanate polymers and ether resin fatty acid esters. In a more specific aspect the invention provides a solution to the above problem plus the added improvement of increasing the adhesion of the polyester coating perfected as to its outer surface in the manner described above. The adhesion factor is overcome by application of the unsaturated polyester resin over a fresh mist coat of a reactive polyisocyanates polymer immediately adjacent the substrate to be finished.

In paint technology a "mist coat" is a very light thin application to a substrate of a finely divided suspension of a liquid in a gas. The applied coating thickness is of the order such that often the deposited liquid particles are insufficient in number to coalesce, though coalescence is not precluded.

The term unsaturated polyesters for the purposes of this invention includes the polymeric products resulting from esterification of unsaturated dicarboxylic acids with polyhydric alcohols. These polyesters are normally reduced with an actively polymerizable vinyl monomer solvent. With the development of the art it has been found feasible to substitute for the unsaturated aliphatic dicarboxylic acid component as much as 90% of both aliphatic and aromatic dicarboxylic acids.

Polyfunctional acids useful as substitutes for part but not all of the unsaturated aliphatic dicarboxylic acids include primarily phthalic anhydride and secondarily isophthalic acid, 3,6 cis endomethylene delta 4 tetrahydrophthalic anhydride, tetrahydrophthalic acid, hexahydrophthalic anhydride, tetrachlorophthalic acid, endochloromethylene tetrahydrophthalic anhydride, the methyl and ethyl esters of said acids, etc. The above enumeration is illustrative but not exhaustive.

Ordinarily, one substitutes not more than about two-thirds of the total dicarboxylic acid component with the saturated acids. The unsaturated dicarboxylic acid component, at at least about a 10% level of total acid present, is essential to provide unsaturation in the polyester polymer with which the vinyl monomers, initially used as diluents, many polymerize without appreciable decrease in ultimate film thickness.

Probably the most used and useful unsaturated dicarboxylic acids in producing the unsaturated polyesters to which this invention is directed are the isomers and homologues of maleic anhydride, maleic acid, itaconic acid, citraconic acid, mesaconic acid, aconitic acid, etc. longer chain saturated aliphatic dicarboxylic acids including adipic, pimelic, azelaic, etc., are also used in part for the dicarboxylic acid component of unsaturated polyester resins.

The polyhydric alcohol component of the invention is standardly a glycol of aliphatic nature but it is well understood in the art that a variety of polyhydric alcohols are useful, depending upon the specific and qualities sought. Alcohols having aromatic nuclei have been used with a major improvement in coating qualities, illustratively, p'-p-isopropylidene bisphenol and ethylene and propylene adducts thereof. Alkylene glycols often employed for unsaturated polyester formation include diethylene glycol, ethylene glycol, 1-3 butylene glycol, dipropylene glycol, propylene glycol, etc. Abietyl alcohol is useful. As can be seen from the foregoing, and as is well known in the art, a wide variety of modifications in components among the reactants essential to unsaturated polyester resins is possible.

Upon heating to esterification temperatures in formation of polyesters it is common practice to include small molar excesses over theory of hydroxyl equivalents. Five to twenty percent stoichiometric excess is common. Cooking or esterification is continued at temperatures of from about 375° to 450° F. to an acid value of from 5 to 50. The polyester resin solids are cooled and are most often diluted to the extent of at least in excess of 20% but not more than about 50% by weight of the reduced polyester product with active vinyl monomers polymerizable with the polyester unsaturation. Among vinyl monomers most useful are styrene and vinyl toluene. Others which have been used successfully in the practice of this invention include dibutyl fumarate, diethyl maleate, 2-ethyl hexyl acrylate, diallyl phthalate, diallyl maleate, methyl methacrylate, acrylonitrile, vinyl pyrrolidone, divinyl spiroli, triallyl citrate, etc. In principle, there must be sufficient unsaturation in the unsaturated polyester to combine with the polymerizable vinyl monomer to convert the liquid polyester system to the cured state after filming.

It is general procedure to employ an excess of the vinyl monomer as solvent for the polyester over that chemically equivalent to the unsaturated component of the polyester polymer. Metal driers, as used in siccative coatings, are generally used with organic peroxides, to accelerate conversion of the vinyl thinned unsaturated polyester polymers from the liquid state to a solid state. The conversion from a sol to a fully hardened state takes place through interpolymerization of the vinyl monomer solvent and the unsaturated polyester polymer.

The following examples are illustrative of unsaturated polyester resins and have been used, as will be shown, in the reduction to practice of the inventive process of interest here. They are believed sufficient to illustrate and to make clear the significance of the term "unsaturated polyester resin."

EXAMPLE 1

Preparation of propylene maleate phthalate resin diluted with methyl methacrylate and styrene.

| | Weights, g. |
|---|---|
| Maleic anhydride | 588 |
| Phthalic anhydride | 888 |
| Propylene glycol | 1003 |
| Total charge | 2479 |

All the ingredients were charged to a 1 gallon kettle and the heat and agitation were started. A $CO_2$ blanket was introduced and maintained throughout the esterification reaction. The heat was cut at 170° F. to allow the exothermic reaction to dissipate. The exotherm reached 320–40° F. The batch was held at 320° F. for 1 hour, then at 350 and 370° F. for 1 hour each, and finally at 392° F. for 6 to 7 hours for an acid value of 35 to 40. The resin was recovered as a hard solid and for later use was dissolved to produce a resin solution containing 62% polyester resin, 28% styrene and 10% methyl methacrylate.

EXAMPLE 2

Preparation of 10% rosin alcohol modified propylene maleate phthalate in styrene.

| | Weights, g. |
|---|---|
| Maleic anhydride | 1024 |
| Phthalic anhydride | 1546 |
| Propylene glycol | 1751 |
| Saturated rosin alcohol (Abitol) | 479 |
| Total charge | 4800 |

All the ingredients were charged to a 2 gallon kettle and the heat and agitation were started. A $CO_2$ blanket was started and maintained throughout the esterification reaction. The heat was cut at 170° F. to allow the exothermic reaction to dissipate. The exotherm reached 320° F., where the batch was held for 1 to 2 hours. It was held for another hour at 350° F. and then for 2 to 3 hours at 392° F. for an acid value of 50 or less. The temperature was raised to 420° F. where it was held for 13 to 14 hours until a check on acid value gave a value of 10 or less. The resin was poured at 100% solids and cut cold to 66⅔% resin solids with inhibited styrene. (Inhibitors used are either volatile at curing temperatures or sufficient accelerator is used to overpower their inhibiting action.)

EXAMPLE 3

Preparation of p-tertiary butyl benzoic acid modified propylene maleate phthalate in styrene.

| | Weights, g. |
|---|---|
| Maleic anhydride | 588 |
| Phthalic anhydride | 888 |
| p-Tertiary butyl benzoic acid | 287 |
| Propylene glycol | 1107 |
| Total charge | 2870 |

All the ingredients were charged to a 1 gallon kettle and heating and agitation started. A $CO_2$ blanket was introduced and maintained throughout the esterification reaction. The heat was cut at 170° F. to allow the exothermic reaction to dissipate. The exotherm reached 310° F. The batch was held 2 hours at 320° F. and 1 hour at 350° F. Heating continued to 392° F. where it was held approximately 18 hours for an acid value of 10. The batch was cooled (with agitation) to 250° F. To the cooled reaction mass was added sufficient inhibited styrene to comprise 33⅓% by weight of the total. In cutting the resin solids, a water cooled condenser was fixed in place over the kettle and external cooling was applied to prevent excess styrene loss.

EXAMPLE 4

Preparation of a propylene maleate isophthalate resin

| | Weights, g. |
|---|---|
| Isophthalic acid | 664 |
| Propylene glycol | 479 |
| Maleic anhydride | 196 |
| Total charge | 1339 |

The isophthalic acid and propylene glycol were charged into a 2 liter flask and heat and agitation started. A $CO_2$ blanket was introduced and maintained throughout the esterification reaction. Heating was gradual. It took 5 to 6 hours to reach 420° F. where the batch was held approximately 5½ hours for an acid value of about 2. Maleic anhydride was added at this point, and the batch was again held at 420° F. for approximately 12 hours. (Acid value below 20.) The resin was poured out of the vessel at 100% solids and later cut, while cold, with inhibited styrene to a resin solids of 60%.

EXAMPLE 5

Preparation of diethylene-propylene maleate nadate in 30% styrene

| | Weights, g. |
|---|---|
| 3,6 endomethylene 4 tetrahydro phthalic anhydride (nadic anhydride) | 984 |
| Maleic anhydride | 392 |
| Propylene glycol | 399 |
| Diethylene glycol | 557 |

All the ingredients were charged to a 1 gallon kettle and heating and agitation started. A $CO_2$ blanket was introduced and maintained throughout the esterification reaction. The heat was cut at 200° F. to allow the exothermic reaction to dissipate. The exotherm reached 318° F. The batch was held at 320° F. and 350° F. for 1 hour each. Heating continued to 392° F., where it was held for approximately 7 to 7½ hours until an acid value of 18 or less was reached. The batch was weighed, and cooled to 250° F. wtih agitation. At this point inhibited styrene was added with stirring using a water-cooled condenser fixed for reflux over the kettle to a resin solids of 70%. External cooling was used when needed during the reduction.

EXAMPLE 6

Preparation of propylene-hydrogenated Bisphenol A fumarate

| | Weight, g. |
|---|---|
| Fumaric acid | 290 |
| Hydrogenated Bisphenol "A" | 331 |
| Propylene glycol | 104 |
| Total charge | 725 |

All the ingredients were charged to a 1 liter flask and the heating started. Agitation was begun as soon as possible. A $CO_2$ blanket was introduced and maintained throughout the esterification reaction. Temperature increase was gradual. The batch was held at 320 and 350° F. for about 1 hour at each temperature level. The resin mass was then held at 392° F. for about 9 hours until an acid value of 35 to 40 was reached. The resin was poured at 100% solids and later cut cold with inhibited styrene to a 60% solids content.

The above examples are not intended to be exhaustive, but demonstrate a number of illustrative and representative species of unsaturated polyester resins useful for purposes of the invention.

The following examples are illustrative of the reactive polyisocyanate resins useful as both prime coats and top coats in the practice of this invention. By reactive polyisocyanate polymer is meant a reaction product of a diisocyanate and an organic molecule containing unreacted groups reactive with the isocyanate group to form urethane groups, the reaction product having one unreacted NCO equivalent group for each urethane group in the polyisocyanate polymer. Among the combinations most illustrative of polyisocyanate polymers are (1) diisocyanates and castor oil, (2) reaction products of diisocyanates and ether resins having an epoxide equivalent of from 870 to 1025 and (3) polymers from reaction of diisocyanates with polyester resins having excess unreacted hydroxyl groups and carboxyl groups in the molecule of the polyester.

EXAMPLE 7

I. 174.2 g. 80/20 2,4-2,6-tolylene diisocyanate
II. 100.0 g. distilled butyl acetate
III. 387.5 g. 80% solution of raw castor oil in xylene
IV. 20.0 g. distilled butyl acetate Weight in I and II, start agitation and blanket with nitrogen. Add III from an additional funnel over a 17 minute period. Allow to exotherm, or apply heat, after all III is in and gain 200° F. Cool rapidly to 110° F., add IV and strain into a suitable container.

Weigh out 81.9 grams of the above product, and (a) 84.3 g. of butyl acetate, (b) 2.9 ml. of a 10% solution of lead naphthenate in mineral spirits, and (c) 1.5 ml. of a 2% solution of cobalt naphthenate in mineral spirits.

EXAMPLE 8

Component 8 "A"

I. 249 parts 2,4 tolylene diisocyanate
II. 249 parts distilled, low alcohol butyl acetate
III. 516 parts of a saturated polyester of trimethylol propane-diethylene glycol-adipic acid-phthalic anhydride having an acid value less than 2 and an isocyanate [1] equivalent of 312
IV. 289 parts distilled, low alcohol content butyl acetate Weigh I and II into a 2 liter flask, equipped with agitator, inert gas inlet, addition funnel, thermometer and heated with an electric heating mantle. Start agitation and inert gas blanket. Add a mixture of III in IV over a one hour period holding temperature below 90° F. When all III and IV solution is in, apply heat to 200° F., cool rapidly to room temperature and strain into suitable container.

Immediately after preparation it has the following characteristics:

| | |
|---|---|
| Viscosity | A— |
| Color | 3 |
| Wt./gal. | 8.7 |
| NVM percent | 59 |

Component 8 "B"

I. 1419 g. dimethyl triphenyl trimethoxy trisiloxane (of av. mol. wt. about 470), sold under the trade name of Sylkyd 50 by Dow-Corning
II. 720 g. trimethylolethane
III. 183 g. ethylene glycol
IV. 30 g. phthalic anhydride
V. 192 g. phthalic anhydride
VI. 366 g. benzoic acid I, II, III, and IV are weighed into a resin kettle and heated to about 360° F. and held until approximately 364 ml. of methanol have been liberated. Then cool to about 270° F. and add V anl VI. Heat to 400 to 430° F. and cook, with a gentle $CO_2$ blow, for an acid value of 5 to 7. Reduce to 80% in butyl acetate and filter. The resin has the following characteristics:

| | |
|---|---|
| Viscosity | R |
| Acid value | 5.68 |
| Color | 2 |

Product 8 "C"

Weigh:
84.8 gms. of Component A
31.4 gms. of Component B
53.9 gms. of butyl acetate
.08 gm. of an acrylic terpolymer solution Mix well and just before spraying add 2.72 gms. of N-ethyl morpholine as catalyst.

[1] The isocyanate equivalent is the number of grams of resin required to react with one isocyanate group.

EXAMPLE 9

I. 1023 g. methylene bis-(4-phenyl isocynate)
II. 930 g. xylene

Weigh I and II into a 3 liter flask fitted with agitator, thermometer, inert gas inlet and condenser. Start inert gas and agitation and heat to 130° F. Hold at 130° F. until dissolved. Filter solution and weigh 1775 gms. of filtered solution into a 5 liter flask, fitted with agitator, inert gas inlet, condenser, addition funnel, and thermometer.

Add 1250 gms. of an 80% solution of raw castor oil in xylen over a one hour period. Allow to exotherm to 130° F. and hold for one hour at 120 to 140° F. after all raw castor solution has been added. The product has the following characteristics:

| | |
|---|---|
| NVM percent | 61.7 |
| Viscosity | D |
| Color | 2 |
| Wt./gal. | 8.25 |

To 134 gms. of the above material is added 102 gms. of xylene, 4.14 ml. of a 10% solution of lead naphthenate in mineral spirits and 2.07 ml. of a 2% cobalt naphthenate solution in mineral spirits.

EXAMPLE 10

To 58.33 gms. of Component 8 "A" is added 41.67 gms. of butyl acetate and just before spraying 1.4 ml. of N-methyl morpholine as catalyst.

EXAMPLE 11

I. 1166.3 g. raw castor oil in xylene (80% NVM)
II. 522 g. 80/20 2,4-2,6-toluene diisocyanates
III. 1282 g. xylene
IV. 59.5 g. methyl diethanol amine Weigh II into a resin flask and add I over a 35 to 40 minute period. Allow to exotherm while addition is being made. After all I is in, cool to 35° C. and add III followed by IV over a 30 minute period. Hold 10 to 15 minutes after all IV is in and pour into a suitable container.

To 100 gms. of this material add:

43 g. xylene
.2 ml. 10% lead naphthenate solution in M.S.
.75 m. 2% cobalt naphthenate solution in M.S.

Example 12, which follows, illustrates a drying oil fatty acid ether resin ester vehicle used in conjunction with a diisocyanate to form a reactive polyisocyanate polymer of the class previously defined as useful in the practice of this invention and which can also be used as the final coating over an unsaturated polyester in the finishing method and producing the product of the method.

EXAMPLE 12

I. 450 g. linseed fatty acids
II. 675 g. Bisphenol A-epichlorohydrin condensate with a melting point of 180–185° F.

Weigh I into a resin kettle and heat to 250° F. under an inert gas blanket. At 250° F. add II and heat to 440° F. starting a light blow after II has been added. Cook at 440° F. for an acid value of 5 to 10. The material has the following characteristics: 50% NVM in xylene, viscosity M, color 11 to 12, acid value 6.57, and wt./gal. 7.91.

A. 480.5 gms. of the above 50% solution
B. 43.52 gms. 80/20 2,4-2,6-toluene diisocyanate
C. 43.52 gms. xylene Weigh B and C into a 1 liter flask, equipped with additional funnel, agitator, inert gas inlet and thermometer, and start the addition of A, timing the addition to require 50 to 60 minutes. Allow to exotherm to 80° F. and control with heat or cooling as needed at 80° F. After all "A" is in, heat to 200° F., cool rapidly to 110° F. and pour into a suitable container.

To 60 gms. of the product, add 40 g. of xylene and just before spraying, 1 ml. of N-methyl morpholine.

EXAMPLE 13

I. 285 g. 80/20 2,4-2,6-toluene diisocyanate
II. 500 g. 80% solution of raw castor oil in xylene
III. 315 g. hi-flash naphtha Weigh I into a 2 liter flask equipped with agitator, addition funnel, thermometer, condenser, and inert gas inlet. Start agitation and inert gas and add II over a 30 to 40 minute period. Allow to exotherm and after all II is in, hold one hour. Add III and allow to mix well. Pour into suitable container. At 62.3% NVM the material has the following characteristics:

Viscosity _____ B
Color _____ 4–5
Wt./gal. _____ 8.35

To 70 gms. of the above add:

70 gms. hi-flash naphtha
1.47 ml. of a 10% solution of lead naphthenate in M.S. (mineral spirits)
.75 ml. of a 2% solution of cobalt naphthenate in M.S. (mineral spirits)

EXAMPLE 14

An epoxy resin of commerce referred to as an ether resin (Epon 1004 of the Shell Chemical Company) which is a condensation product of epichlorohydrin and "Bisphenol-A" (p-p'-isopropylidene bisphenol) having an epoxy equivalent of 1 gram equivalent of epoxide groups in 870 to 1025 grams of resin and a melting point by Durrans' mercury method of 95–105° C. was used as a reactant as follows:

1407 parts of ether resin (as described)
1153 parts linseed fatty acids were esterified under an inert gas atmosphere and agitation at a temperature of 450 to 470° F. to an acid value less than 6. The ether-ester polymer resulting was reduced to a solids content of 70% with xylene. The ether resin fatty acid ester had the following characteristics:

Viscosity (Gardner-Holdt) _____ $Z_3$
Color _____ 7
Acid value _____ 5.7
Wt./gal. _____lbs__ 8.31

To 200 g. of the above add:

.72 ml. of a 6% manganese naphthenate solution in mineral spirits
.73 ml. of a 6% cobalt naphthenate solution in mineral spirits
150 g. xylene

EXAMPLE 15

Same as above only low rosin content tall oil fatty acids were used to replace linseed fatty acids on an equal weight basis.

EXAMPLE 16

Same as above only use dehydrated castor fatty acids to replace linseed and/or tall acids.

EXAMPLE 17

To 200 gms. of the unsaturated fatty acid Epon 1004 ester product in Example 15 add 200 g. butyl acetate
1.4 g. dioctyl sebacate
1.44 ml. 6% manganese naphthenate in M.S.
1.46 ml. 6% cobalt naphthenate in M.S.

Mill well for spray use.

EXAMPLE 18

Same as Example 17 only using dehydrated castor product of Example 16.

EXAMPLE 19

200 gms. of the dehydrated castor product of Example 16
200 gms. of butyl acetate
1.4 gms. of dioctyl sebacate
1.44 ml. of a 6% solution of manganese naphthenate
1.46 ml. of a 6% solution of cobalt naphthenate
26.4 g. of a urea-formaldehyde resin of 50% NVM content (water insoluble resin)

The above are mixed well and just before spraying catalyzed with 1% $H_3PO_4$ based on the weight of urea-formaldehyde solids.

The foregoing examples numbered Example 12, 14, 15, 16, 17, 18 and 19 are representative examples illustrating the meaning of the term ether resin fatty acid esters. Variations in composition are apparent to those skilled in the protective and decorative coatings art.

Examples 7, 8A, 9, 10, 11 and 13 are representative examples illustrative of reactive polyisocyanate resins useful for the purposes of the invention.

The foregoing examples are inserted to provide illustration of the significance of terms essential to the description of the invention and convenient means for the illustration of the best modes of its practice. Examples of practice of the invention are later included. Having illustratively described the essential components of the invention and laid a foundation clearly understandable as to the terminology essential to description, it is now in order to establish the objects of the invention and the means of reduction to practice of the invention.

As heretofore indicated for purposes of general orientation, this invention is concerned with the problem of successful application of unsaturated polyester resins to a variety of substrates and particularly to wood. Heretofore the unsaturated polyesters, though of great potential, were unavailable for many surface coating applications due to inherent inhibition of surface cure. When polyesters are applied in accordance with the present state of the art the surface of the polyester is not cured and is lacking in essential smoothness (crawling and cratering), hardness, mar resistance and adhesion to dense substrates.

The principal object of this invention is to provide a finishing system utilizing polyesters in a novel method so that the surface subsequent to coating is highly planar and smooth without resort to sanding and polishing operations, heretofore necessary.

A secondary object is to improve the adhesion of polyester finishes to wood and metal substrates by application of the polyester over selected primers by utilization of a wet-spray technique without drying between coats.

Having described the nature of the coatings useful for the purposes of the invention, refer now in particular to the drawings which more fully illustrate the invention, in which:

FIGURES 1 through 6 are sectional views of a portion of a wooden substrate broken out from the surface of an article finished in accordance with the methods of the invention.

Referring in particular detail to the drawings: 1 is a wooden substrate section; 2 is a film of from about 2 to about 5 mils in thickness of a reactive polyisocyanate primer having residually active isocyanate groups; 3 is a polyester coating as hereinbefore described and is the primary coating which it is desired to apply in a more perfect form than heretofore known, and is of the order of 5 to 20 mils in thickness, 4 represents a mist coat which for all practical purposes will be applied in a thickness of less than one mil but it of the same composition as 2; 5 is also a mist coat as to thickness, never needed in films of more than one mil in thickness and may be operatively applied at less than one mil with substantially as good results and is alternatively useful in place of coatings identified as 4, though of a composition heretofore identified as an ether resin unsaturated fatty acid ester.

Figure 2:
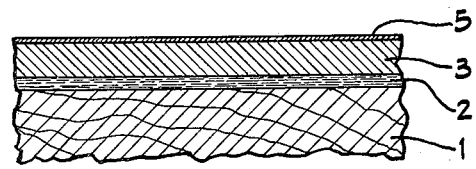
Figure 3:
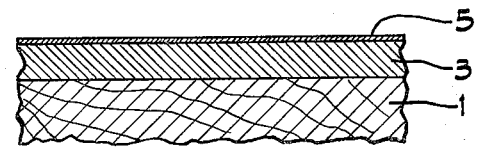
Figure 4:
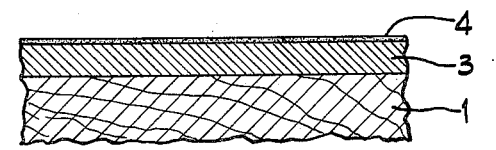
Figure 5:
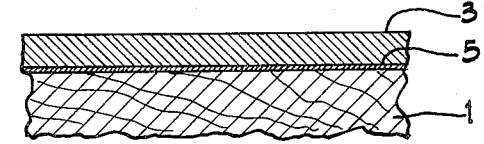
Figure 6:
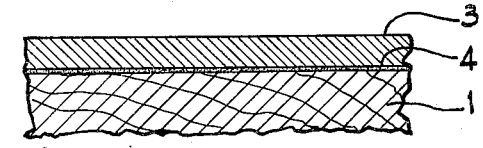

FIGS. 1 and 2 represent preferred practices; FIGS. 3 and 4 detail operable modifications of second order of preference which overcome the principal problem left unsolved by the prior art, and FIGS. 5 and 6 represent an advance in the art, but inferior in practical value over the combinations previously identified in the drawings.

In the preferred practice of this invention as detailed in FIG. 1, the method utilizes sequential application of a reactive polyisocyanate polymer applied to the substrate, immediately thereafter applying a full coat of unsaturated polyester resin of from 5 to about 15 mils thickness, but preferably from 6 to 10 mils and over this an application of a mist coat of about one mil thickness of the same or a similar reactive polyisocyanate resin top coat.

Following a similar method of sequential application without appreciable time lapse between coats (e.g. less than the usual time lapse for the applied coating to undergo change from a sol state to a gel state) one may employ an ether resin fatty acid ester wherein the basic ether resin has an epoxy equivalent of one gram equivalent of epoxide group in 190 to 4000 grams of resin. See FIGURE 2. The latter may be used in lieu of the final mist coat of reactive polyisocyanate polymer.

In an alternative method, with some sacrifice in adhesion when the substrate is of a dense and relatively unpermeable nature, the primer coat of reactive polyisocyanate polymer may be eliminated from the system as illustrated in FIGURES 3 and 4. In cases of this nature adhesion falls to the level of use of the polyester alone. When using thick films such as produce the great depth and lustre which dictate use of polyesters, particularly in wood finishing, elimination of the primer is not desirable, but may be in some instances tolerable. This invention contemplates the simplified two-coat process method where the ultimate in adhesion is not required.

Thus, the invention in its broadest aspect is concerned with the problem of obtaining a full cure of the surface of polyester resins in their conversion from a sol to fully cured hardened state by immediate application to the wet surface of the polyester a mist coat of about 1 mil thickness of a resin selected from the group consisting of reactive polyisocyanate polymers and ether resin fatty acid esters.

The foregoing methods give rise to new, novel and useful compositions of matter which comprise an unfinished substrate of wood, metal, etc., and the sequence of coatings resulting from the practice of the foregoing methods.

The following examples illustrate the preferred practice of the invention.

EXAMPLE 20

Over a freshly sanded wood substrate (maple panel) was sprayed a full wet coat of the reactive polyisocyanate resin of Example 9 at a gun pressure of about 25 pounds. Conveniently thereafter, but while the primer coat was still wet, was sprayed at a gun pressure of 30 to 45 pounds (lower end of range preferred), a 5 to 15 mil thickness of the polyester resin of Example 5 over the wet primer (8 mils thickness).

Following the primer coat and the polyester, the spray operator applied a mist coat of the same reactive polyisocyanate polymer used as a primer, namely a material as illustratively described in Example 9. The coating applied was about one mil in thickness and applied at about 20 pounds' pressure at the gun. After a period of ten minutes in the air, the panel was cured at 140° F. for one hour.

The above specific combination provided a clear coating over wood having beautiful depth, excellent adhesion with no separation of the coatings from the substrate or from one another with an impact test of 17 inch-pounds. The coating was extremely smooth, had good gloss and required no polishing to obtain its maximum lustre and gloss.

The surface was extremely mar resistant and free from cratering and crawling found with application of polyester resins of themselves.

EXAMPLE 21

A panel of the same stock as used in Example 20 was finished by direct application thereto of the polyester resin of Example 5. Over the wet-film was applied a mist coat of reactive polyisocyanate polymer of the quality described in Example 9. The panel was allowed to dry in the air for not more than about fifteen minutes and cured at 140° F. for about one hour.

The surface appearance, gloss, hardness (mar-resistance), and depth were not materially different than obtained in Example 20, except adhesion was impaired, separation between the wood substrate and the polyester noted at an impact of less than 17 inch-pounds. Often failure is due to the deformation of the substrate rather than the film itself.

EXAMPLE 22

To demonstrate usefulness of the primer coat, a maple panel from the same stock as the previous two examples was prepared for test.

To the panel, in the same manner as in Example 20 was applied a film of about 1 mil thickness of the reactive polyisocyanate polymer of Example 9. Over the wet film was applied an 11 mil film thickness of the polyester resin of Example 5.

Conveniently thereafter a mist coat of the ether-ester resin of Example 14, as reduced, was applied using the application technique described in Example 20. Following application of the ether-ester top coat the panel was cured at 140° F. for one hour.

Examination of the panel after cooling showed excellent adhesion under impact. Flow, surface-hardness and freedom from surface defect were rated very good and equivalent to the results obtained upon test of the panel of Example 20.

EXAMPLE 23

A series of panels, other than wood, including 23a aluminum, 23b bonderized steel, 23c steel, 23d fibre board, and 23e tempered Masonite were treated with the coating systems as described in Examples 20, 21 and 22. In all cases improvement over use of polyester alone was observed relative to the qualities of flow, mar-resistance, surface hardness and gloss. Adhesion in the absence of the primer over the more dense substrates was less satisfactory. Impact resistance over fibre board, was poor as anticipated, due to the soft substrate.

EXAMPLE 24

A series of panels using a variety of woods, commonly employed in furniture and related arts, were coated in accordance with the procedures of Examples 20, 21 and 22. The woods used were 24a gum, 24b maple, 24c oak, 24d walnut, 24e birch and 24f alder. In all test panels finished with systems corresponding to Examples 20 and 22 the adhesion, mar-resistance, hardness and gloss, along with freedom from surface imperfections, were considerably improved over the control using the polyester coating alone. In the series corresponding to Example 21, adhesion was somewhat inferior.

EXAMPLE 25

A series of maple panels were prepared for illustrative use of a variety of polyesters in the three coat system as herein described. They were first primed with the coating of Example 9 and while the primer was still wet, re-coated with the following unsaturated polyester resins as representative of the class.

| Panel | Polyester of— |
|---|---|
| 25a | Example 1. |
| 25b | Example 2. |
| 25c | Example 3. |
| 25d | Example 4. |
| 25e | Example 6. |
| 21 | Example 5. |

The primed and polyester coated maple panels were then top-coated with a mist coat of the reactive polyisocyanate polymer of Example 9. All panels were cured at 140° F. for one hour. Each of the panels identified above showed improvement in smoothness, mar-resistance, flow, gloss, hardness, adhesion and impact resistance over its comparative control panel coated with the polyester alone.

EXAMPLE 26

Again selecting maple panels for illustrative purposes, the panels after sanding were primed with the following materials:

26a _____ Resin of Example 7.
26b _____ Resin of Example 8a.
26c _____ Resin of Example 8c.
26d _____ Resin of Example 10.
26e _____ Resin of Example 11.
26f _____ Resin of Example 9.
26g _____ Resin of Example 13.

Each of the panels were then coated with the polyester resin of Example 5 and immediately followed (as fast as one operator could re-coat) with a mist coat of the identical resin solution used as a primer. The panels were cured one hour at 140° F. All of the panels were much improved over the control panel coated solely with the polyester of Example 5 as to the qualities previously described to be important to commercial use of polyester finishes.

EXAMPLE 27

A number of maple panels were sanded, a mist coat of the reactive polyisocyanate resin of Example 9 applied, followed by a wet-coat of the polyester resin of Example 5 and over the wet polyester film in each instance was applied a mist coat of the ether resin fatty acid ester as described in the examples and in accordance with the following schedule:

| Panel No. | Ether resin fatty acid ester |
|---|---|
| 27a | Example 12. |
| 27b | Example 14. |
| 27c | Example 15. |
| 27d | Example 16. |
| 27e | Example 17. |
| 27f | Example 18. |
| 27g | Example 19. |

Each of the panels were cured at 140° F. for one hour, more or less. Each of the panels were, by comparison with the polyester alone, far superior in the qualities of the finish than the polyester material alone over the substrate and similarly cured.

From the previous illustrative examples it can be seen that the system in the preferred form comprises three layers (1) a reactive polyisocyanate prime coat, (2) a full coat of unsaturated polyester and (3) a top mist coat of selected material over the polyester. The prime coat and the top mist coat may be the same or a different material. Depending upon the properties desired, the prime coat may be omitted. If the top mist coat is used alone with the polyester, the resultant film has good flow and mar resistance but over hard, smooth, relatively non-porous substrates adhesion is adversely affected through the omission.

Application of this system involves a wet-spray technique. The prime coat is applied to the substrate as a wet coat approximately one mil or less in thickness. The gun pressure used is approximately 20 to 30 lbs. This is followed in a few moments by a full coat of unsaturated polyester sprayed at 30 to 50 lbs., depending upon the viscosity. Generally, the lower end of the above pressure ranges are preferable. The polyester film may be 5 to 15 mils thick although 6 to 10 mils thickness is preferred. A light top coat is sprayed over the polyester almost immediately. This mist coat is sprayed at about 20 lbs. pressure and is approximately one mil thick. The coated object is then allowed to flash for a short time before being placed in the oven. This time interval does not appear too critical provided most of the air bubbles and excess inert solvent have escaped. The curing schedule initially used was ½ hour at 120 plus 1 hour at 140° F. We now prefer to use 1 hour at 140° F. The latter seems adequate. The application procedure is the same whether only two or all three parts of the system are included, involving merely an omission of either the primer or top mist coat.

As a primer to improve adhesion, a very useful species has been the reactive polyisocyanate made from castor oil and methylene bis-4-phenyl isocyanate.

From among the wide variety of materials tested as topcoats, the polyisocyanate made from castor oil and methylene bis-4-phenyl isocyanate has been most effective. However, it is equaled by materials such as the ether resin fatty acid esters. Drying oil modified alkyds and nitrocellulose lacquers have been effective as top coats insofar as gloss and flow are concerned. but are wanting in mar resistance of the finished surface.

Most of the above vehicles are air drying and are catalyzed by inclusion of driers. The driers added illustratively may be 0.5% Pb and 0.05% Co as metals based on the weight of the vehicle solids. The castor polyisocyanate is sprayed at approximately 35% solids in xylene or other suitable solvent and the epoxy esters are generally applied at approximately 35 to 40% solids.

Due to the viscosity of most of the vinyl solvent containing unsaturated polyesters, it has usually been necessary to dilute them further to spraying viscosity. This has been done by adding excess styrene and/or other solvents, illustratively, ethyl acetate, butyl acetate, acetone, methyl ethyl ketone, hi-flash naphtha, turpentine and cyclohexanone. Those found the most practical include ethyl acetate and butyl acetate, alone or combined, or in conjunction with added vinyl monomer. The esters are more efficient solvents in this system than styrene since they reduce the viscosity more rapidly for a given quantity of solvent added. The solvents used may vary from 5 to 35% by weight of the original polyester-vinyl monomer solution.

The catalyst system used in the polyester layer is generally of the oxidation-reduction type. A small percentage, usually about 0.02% of cobalt metal in the form of a metal-organic oil soluble salt, is mixed in the resin at the time additional solvents, etc. are added. Then peroxide is added just before the material is sprayed. The peroxides used include 60% methyl ethyl ketone peroxide in dibutyl phthalate, 50% cyclohexanone peroxide in dibutyl phthalate and cumene hydroperoxide. The amount used may vary from 1 to 4%. Generally, the preferred catalyst has been 0.6 to 1.5% of methyl ethyl ketone peroxide. The mixture has a short pot life—about ½ hour. For more extended pot life, cumene hydroperoxide may be used. The whole system is somewhat dependent on the correct balance of solvent and catalyst, since it controls the application characteristics and to an extent the rate of cure of the resulting film.

Having thus described our invention, we claim:

1. A method of surface coating substrates which comprises sequentially applying to said substrate a film of an unsaturated polyester resin diluted with a monomeric vinyl compound polymerizable therewith to the extent of at least in excess of 20% but not more than about 50% by weight of the reduced polyester product and a mist coat of an organic polymerizable coating composition selected from the group consisting of reactive polyisocyanate polymers having one unreacted NCO group for each urethane group in the polymer molecule and ether resin-unsaturated fatty acid esters and co-curing said films.

2. A method of surface coating substrates which comprises sequentially applying a thin film of an active polyisocyanate polymer, an unsaturated polyester resin dissolved in a monomeric vinyl compound polymerizable therewith to the extent of at least in excess of 20% but not more than about 50% by weight of the reduced polyester product and a mist coat of an organic polymerizable coating composition selected from the group consisting of reactive polyisocyanate polymers having one unreacted NCO group for each urethane group in the polymer molecule and ether resin-unsaturated fatty acid esters and co-curing said films.

3. A method of surface coating a wooden substrate which comprises sequentially applying a film of a reactive polyisocyanate polymer, an unsaturated polyester resin diluted with monomeric vinyl compound polymerizable therewith to the extent of at least in excess of 20% but not more than about 50% by weight of the reduced polyester product and a mist coat of a reactive polyisocyanate polymer and co-curing said films having one unreacted NCO group for each urethane group in the polymer molecule.

4. A method of surface coating a substrate which comprises sequentially applying a 5 to 15 mil thickness of an unsaturated polyester resin diluted with a monomeric vinyl compound polymerizable therewith to the extent of at least in excess of 20% but not more than about 50% by weight of the reduced polyester product to a wet film thickness of from about 5 to 15 mils and while said coating is in the sol state, applying thereto a mist coat when wet of about 1 mil thickness of a coating composition selected from the group consisting of active polyisocyanate polymers having one unreacted NCO group for each urethane group in the polymer molecule and ether resin-unsaturated fatty acid esters and co-curing said plural coatings.

5. A method of surface coating a substrate which comprises sequentially applying a film of a reactive polyisocyanate polymer of about 1 mil wet thickness, an unsaturated polyester resin diluted with a monomeric vinyl compound polymerizable therewith to the extent of at least in excess of 20% but not more than about 50% by weight of the reduced polyester product of from about 5 to 15 mils thickness and a mist coating not exceeding about 1 mil thickness of an organic polymerizable coating composition selected from the group consisting of active polyisocyanate polymers and co-curing said plural coatings and ether resin-unsaturated fatty acid esters.

6. A method of surface coating a wood substrate which comprises sequentially applying a wet film of a reactive polyisocyanate polymer of about 1 mil thickness and while said first film is in a sol state, applying a wet film of from 5 to 15 mils thickness of an unsaturated polyester resin diluted with a monomeric vinyl compound polymerizable therewith to the extent of at least in excess of 20% but not more than about 50% by weight of the reduced polyester product and while said second coat is in the sol state, applying thereto a mist coat of an organic polymerizable coating composition selected from the group consisting of active polyisocyanate polymers having one unreacted NCO group for each urethane group in the polymer molecule and ether resin fatty acid esters and co-curing the plural coatings.

7. A method of surface coating a wood substrate which comprises sequential application of a wet film of a reactive polyisocyanate polymer having one unreacted NCO group for each urethane group in the polymer molecule of about 1 mil thickness and while said first film is in a sol state, applying a wet film of from 5 to 15 mils thickness of an unsaturated polyester resin diluted with a monomeric vinyl compound polymerizable therewith to the extent of at least in excess of 20% but not more than about 50% by weight of the reduced polyester product and while said second coat is in the sol state, applying thereto a mist coating of a similar reactive polyisocyanate polymer and co-curing said films.

8. A method of finishing a wood substrate which comprises sequential application of a wet film of a reactive polyisocyanate polymer having one unreacted NCO group for each urethane group in the polymer molecule of about 1 mil thickness and while said first film is in a sol state, applying a wet film of from 5 to 15 mils thickness of an unsaturated polyester resin diluted with a monomeric vinyl compound polymerizable therewith to the extent of at least in excess of 20% but not more than about 50% by weight of the reduced polyester product and while said second coat is in the sol state, applying thereto a mist coat of an unsaturated fatty acid ester of an ether resin having an epoxy equivalent of 1 gram equivalent of epoxy groups in 190 to 1400 grams of resin and co-curing said films.

9. A method of finishing a wood substrate which comprises sequential application of a wet film of a reactive polyisocyanate polymer of about 1 mil thickness and while said first film is in a sol state, applying a wet film of from 5 to 15 mils thickness of an unsaturated polyester resin diluted with a vinyl monomer polymerizable therewith to the extent of at least in excess of 20% but not more than about 50% by weight of the reduced polyester product and while said second coat is in the sol state, applying thereto a mist coat of an ether resin-unsaturated fatty acid ester wherein the ether resin component thereof has a epoxy equivalent of 1 gram equivalent of epoxy groups in 190 to 1400 grams of resin, the fatty acid characterized by an iodine value of in excess of 100 as the triglyceride oil and co-curing said films.

10. A method of finishing a wood substrate which comprises sequential application of a wet film of a reactive polyisocyanate polymer having one unreacted NCO group for each urethane group in the polymer molecule of about 1 mil wet thickness and while said first film is in a sol state, applying a wet film of from 5 to 15 mils thickness of an unsaturated polyester resin diluted with a monomeric vinyl compound polymerizable therewith to the extent of at least in excess of 20% but not more than about 50% by weight of the reduced polyester product and while said second coat is in the sol state, applying thereto a mist coat of an ether resin-unsaturated fatty acid ester wherein the ether resin has an epoxy equivalent of 1 gram equivalent of epoxy group in 870 to 1025 grams of resin and the unsaturated fatty acid is a drying oil fatty acid having an iodine value as the triglyceride in excess of 100 and co-curing said films.

11. A method of finishing a substrate which comprises the sequential application thereto of a mist coat of a reactive polyisocyanate polymer comprising the reaction product of methylene bis-4-phenylisocyanate and castor oil having one unreacted NCO group for each urethane group in the polymer molecule, and unsaturated polyester resin comprising the reaction product of maleic anhydride and an alkylene glycol diluted with a monomeric vinyl compound polymerizable therewith to the extent of at least in excess of 20% but not more than about 50% by weight of the reduced polyester product and while said second coat is still in an uncured condition applying thereto a final mist coat of the first named polyisocyanate polymer and co-curing said plural coatings.

12. A product which comprises a substrate surface, a film of an unsaturated polyester resin and a monomeric vinyl compound polymerizable therewith to the extent of at least in excess of 20% but not more than about 50% by weight of the reduced polyester product over said substrate surface and a mist coat not greater than one mil in wet thickness in intimate contact with the surface of said polyester coating a top-coating selected from the group consisting of reactive polyisocyanate polymers having one unreacted NCO group for each urethane group in the polymer molecule and ether resin-unsaturated fatty acid esters.

13. A product which comprises a substrate surface, a thin film not greater than one mil in wet thickness of a reactive polyisocyanate polymer having one unreacted NCO group for each urethane group in the polymer molecule over said substrate, a heavier film of an unsaturated polyester resin over said polyisocyanate containing a monomeric vinyl compound polymerizable therewith to the extent of at least in excess of 20% but not more than about 50% by weight of the reduced polyester product and in intimate contact with the surface of said polyester a mist coat of a coating selected from the group consisting of reactive polyisocyanate polymers and ether-resin unsaturated fatty acid esters.

14. A product which comprises a substrate surface, a film of from about 5 to 15 mils thickness of an unsaturated polyester resin diluted with a monomeric vinyl compound polymerizable therewith to the extent of at least in excess of 20% but not more than about 50% by weight of the reduced polyester product and a top coat of about 1 mil thickness of less than a coating composition selected from the group consisting of active polyisocyanate polymers having one unreacted NCO group for each urethane group in the polymer molecule and ether resin-unsaturated fatty acid esters said coatings co-cured over said substrate.

15. A product which comprises a substrate surface, a film of less than about 1 mil wet thickness of a reactive polyisocyanate polymer having one unreacted NCO group for each urethane group in the polymer molecule, a film of about 5 to 15 mils thickness of an unsaturated polyester resin diluted with a monomeric vinyl compound polymerizable therewith to the extent of at least in excess of 20% but not more than about 50% by weight of the reduced polyester product, and a film of about one mil thickness of a coating composition selected from the group consisting of active polyisocyanate polymers and ether resin-unsaturated fatty acid esters said coatings applied in sequence in the order given and co-cured over said substrate.

16. The same as claim 15, wherein the final top coating is an active polyisocyanate polymer having one unreacted NCO group for each urethane group in the polymer molecule.

17. The same as in claim 15, wherein the final top coating is an ether resin-unsaturated fatty acid ester.

18. A product which comprises a wooden substrate surface, a relatively heavy film of at least in excess of about five mils of an unsaturated polyester resin diluted with a monomeric compound polymerizable therewith to the extent of at least in excess of 20% but not more than about 50% by weight of the reduced polyester product over said substrate and a relatively thin film of less than about one mil in contact with the surface of said polyester of a coating selected from the group consisting of reactive polyisocyanate polymers having one unreacted NCO group for each urethane group in the polymer molecule and ether resin-unsaturated fatty acid esters.

References Cited in the file of this patent

UNITED STATES PATENTS

| | | |
|---|---|---|
| 2,430,479 | Pratt | Nov. 11, 1947 |
| 2,741,566 | Demme | Apr. 10, 1956 |
| 2,828,222 | Kine et al. | Mar. 25, 1958 |
| 2,852,413 | Tischbein | Sept. 16, 1958 |
| 2,884,339 | Dannenberg | Apr. 28, 1959 |
| 2,891,876 | Brown et al. | June 23, 1959 |

FOREIGN PATENTS

| | | |
|---|---|---|
| 821,934 | Germany | Nov. 22, 1951 |

UNITED STATES PATENT OFFICE

CERTIFICATE OF CORRECTION

Patent No. 2,993,807                                  July 25, 1961

Austin C. Abbott, Jr., et al.

It is hereby certified that error appears in the above numbered patent requiring correction and that the said Letters Patent should read as corrected below.

Column 8, line 8, for "Mill" read -- Mix --.

Signed and sealed this 5th day of December 1961.

(SEAL)
Attest:

ERNEST W. SWIDER                                DAVID L. LADD
Attesting Officer                                     Commissioner of Patents